Nov. 21, 1944.  E. S. LARSON  2,363,253
HELIX CLUTCH
Filed Dec. 28, 1942  2 Sheets-Sheet 1

INVENTOR
EDWARD STANLEY LARSON
BY J. H. B. Whitfield
ATTORNEY

Nov. 21, 1944.  E. S. LARSON  2,363,253
HELIX CLUTCH
Filed Dec. 28, 1942   2 Sheets-Sheet 2

INVENTOR
EDWARD STANLEY LARSON
BY *H. B. Whitfield*
ATTORNEY

Patented Nov. 21, 1944

2,363,253

UNITED STATES PATENT OFFICE 2,363,253

HELIX CLUTCH

Edward S. Larson, Chicago, Ill., assignor to Teletype Corporation, Chicago, Ill., a corporation of Delaware Application December 28, 1942, Serial No. 470,345

8 Claims. (Cl. 197—44)

The present invention relates to clutch devices and more particularly to clutch mechanisms for use with printing telegraph apparatus.

In start-stop telegraph selector apparatus, the principle of the overrunning clutch is employed as a means of mechanically associating a continuously rotating source of power with an intermittently arrestable type wheel or other device of selectable elements. As heretofore practiced, mechanical driving connections of this general class were established through a pair of compression disc members having an intermediate friction ring maintained under spring tension so as to effect a driving connection between one disc member and the other whereby the intermittently arrestable type wheel or other selector device was permitted freedom of rotation.

When under such conditions a type wheel is arrested, the spring tension of the friction coupling is mechanically overcome so as to effect a relative slippage during the time that the type wheel is at rest and until, subsequently, when it is again released for rotation. In the design of such apparatus, the electric motor or other driving device necessarily had to be of sufficient power to overcome the resistance in the friction drive which prevails during the arrested condition of the type wheel and on this account its power requirements were frequently far in excess of that necessary in the performance of the primary purpose of merely rotating the type wheel from one position to another. Consequently, it is recognized as advantageous to provide a clutch member which, during the idle condition of the type wheel, that is, when driving connection is to be suspended, contributes little or no additional load and therefore requires but a minimum of force, thereby diminishing the total power requirements of the prime mover and permitting the design of printing apparatus which may perform satisfactorily with the use of but small electric motors and also incurring less wear upon the clutch elements.

Accordingly, the principal object of the present invention is to provide a clutch device suitable for use with printing telegraph apparatus, which exerts a minimum of frictional resistance during the idle or non-rotating period of the apparatus.

Towards the attainment of these and other objects, there is proposed herein a frictional clutch coupling of fundamentally different principle from that employed heretofore, in so far as the engagement member between the driving and driven elements is held during idle condition so as to exert a minimum of frictional engagement while, nevertheless, presenting for driving engagement powerful spring tension for effecting ample surface engagement during the time when driving connection is to prevail.

Briefly, this is attained by the use of a helical driving member, one end of which is anchored to the driven portion of the assembly, and the other end of which is held by an arresting component, such as any one of a series of individually selectable pins adapted to be moved into the path of the driven member to arrest the latter at a predetermined position which is characteristic of a particular selection. Driving engagement is effected by permitting the spring helix to exert its constricting torque in the direction of driving rotation. This tends to further constrict its convolutions and to render more positive the driving engagement. During arrestment the helix is distended by causing the obstructive element to unwind the convolutions until ample space between the helix and the drive shaft is obtained.

For a more comprehensive understanding of this invention, reference may be had to the accompanying drawings and to the following detailed specification, wherein like reference characters designate corresponding parts throughout, and wherein, Fig. 1 is a perspective view of a portion of a type wheel printing mechanism indicating schematically and fragmentally certain portions of the selector unit and other portions incident to the type wheel operation and driving relationship in a condition of operation just preceding arrestment;

Figure 1:
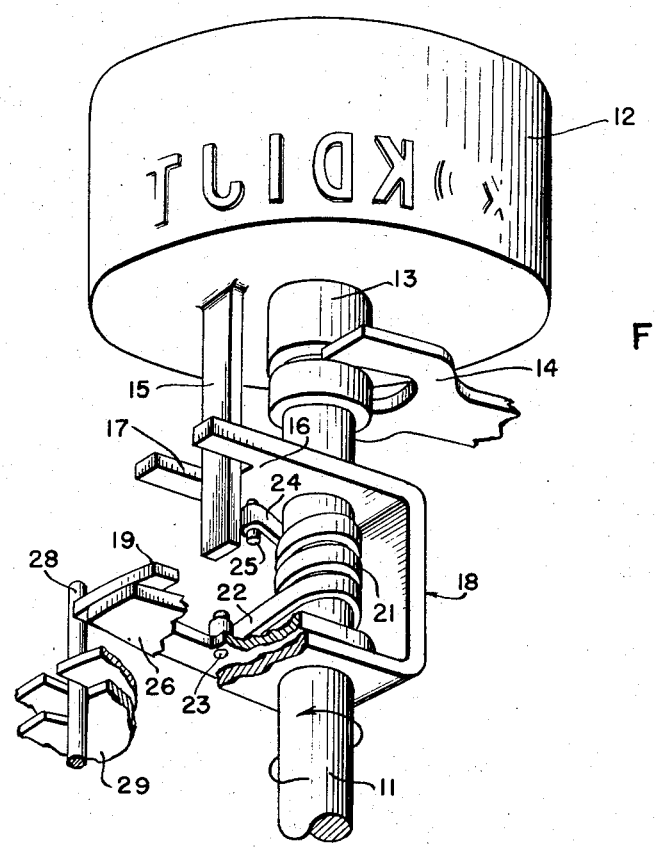
Figure 2:
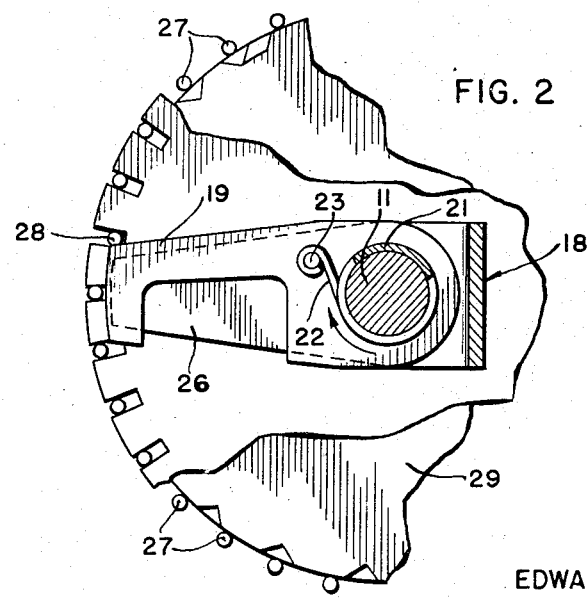
Fig. 2 is a plan sectional view through a portion of the clutch mechanism featured in Fig. 1 viewing the selector apparatus in the background.
Figure 3:
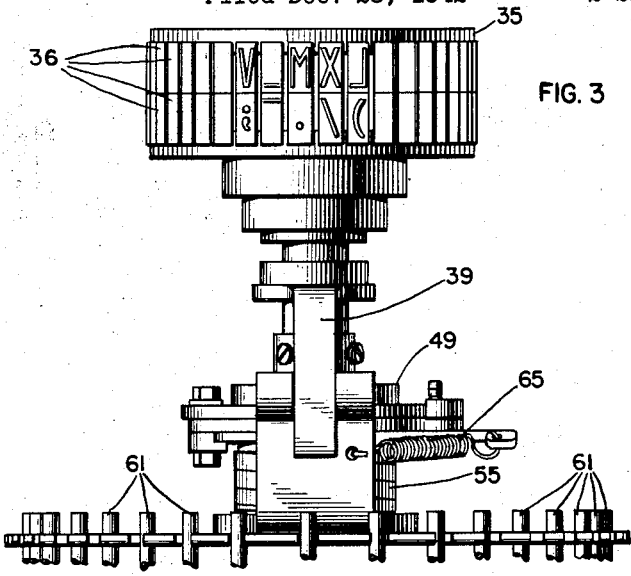
Fig. 3 is a front elevation of a modified form of clutch mechanism which utilizes certain features of the present invention.

Referring now more particularly to Figs. 1 and 2 of the drawings, the reference character 11 designates a type wheel carrying shaft. The clutch element may be correspondingly associated with any selectable device, and, so far as the present invention is concerned, need only partake of the characteristics of a connection between an intermittently arrestable member and a continuously driven mechanism such as that between the shaft 11 and the dependent mechanism driven thereby. In the particular instance, the dependent mechanism is a type wheel 12, which is loosely carried upon the shaft 11 and whose circumferentially grooved hub 13 receives the shifting yoke member 14 through the movement of which it may be elevated so as to bring into printing registration one or the other of two peripheral alignments of type printing characters, Fig. 1.

Driving connection between the shaft 11 and the type wheel 12 is effected through a clutch coupling which includes a depending lug or tenon 15 integrally associated with the type wheel and by means of which the type wheel continues to have positive driving engagement with an uppermost arm 16 of a yoke member 18 while said type wheel is in either of its shift conditions. The relationship obtains for the reason that said lug or tenon 15 is received within the forked extremity 17 of the driving channel or yoke member generally indicated 18 and also loosely carried upon drive shaft 11.

Shaft 11 is rotated in a counterclockwise direction, as viewed in Fig. 1, clockwise in Fig. 2, and around its periphery is frictionally wrapped a constrictor spring 21, preferably shaped of flat spring steel stock and proportioned so as to exert a moderate constrictive force around shaft 11 with one of its terminals 22 secured to a pin 23, carried by a loosely pivoted arm 19 within the driving yoke 18, and its other terminal 24 secured to a pin 25 in the upper arm 16 of said yoke.

The normal wrapping or constricting force of spring 21 is sufficient to cause it to adhere firmly to shaft 11 and to maintain arm 19 slightly in advance of the lowermost arm 26 of yoke 18, in terms of the direction of rotation, clockwise as viewed in Fig. 2 of the drawings. Arms 19 and 26 are of such length, see Fig. 2, as to normally clear the several pins 27 of a pin barrel selector mechanism, when said pins are in their outward or nonselected condition. When any one of the pins, such as 28, is moved inwardly pursuant to the characteristic angular placement of a set of selector discs 29, that pin in so doing moves into the path of both of the arms 19 and 26, obstructing the further rotation of the yoke assembly 18, and since the arm 19 is foremost of the two, that member is encountered first by the pin 28 and is moved back until the two arms are brought into relative vertical alignment and the driven element (specifically yoke 18) of the clutch assembly thereby arrested.

Because of the afore-described relative movement between arms 19 and 26, the constrictor spring 21 becomes distended and its convolutions are enlarged in diameter so as to permit the slipping of shaft 11 within its coil. This results from the fact that one end of spring 24 is carried by the arm 16 of bail 18 and the other end of spring 22 by the movable arm 19. The spring then undergoes a torsion as a result of which the end 24 is rotated clockwise a short distance, while the end 22 is held through the obstruction of its integrally associated arm 19. The opening of the convolutions of constrictor spring 21 furthermore reduces the amount of frictional engagement between it and shaft 11 and permits shaft 11 to rotate with a somewhat greater degree of freedom, partially relieved of its load, now transformed from a frictional engagement with spring 21 to the work of holding open the convolutions of coil spring 21.

When another pin 27 is moved into selected position and the particular pin 28 restored into the outermost peripheral alignment, a performance well known in this class of printing telegraph apparatus, arm 19 is freed thereby, and being under the influence of spring 21, resumes its forward position and again permits spring 21 to constrict itself about shaft 11. As a result, the driving engagement between shaft 11 and spring 21 is restored and the type wheel 12 is again rotated by the afore-described coupling assembly.

Attention is now directed to Figs. 3, 4, 5, and 6 wherein there is illustrated a modified form of clutch mechanism. Here the reference character 35 designates generally a type wheel of the class illustrated in U. S. Patent No. 2,247,408. In a printing machine of the class featured in this patent the rotary type wheel 35 carries a plurality of radially movable type plungers 36, each having a printing intaglio and all held inwardly by garter springs which exert their influence upon any one of the plungers 36 that is displaced outwardly as a result of the printing stroke by a hammer 37.

Figure 5:
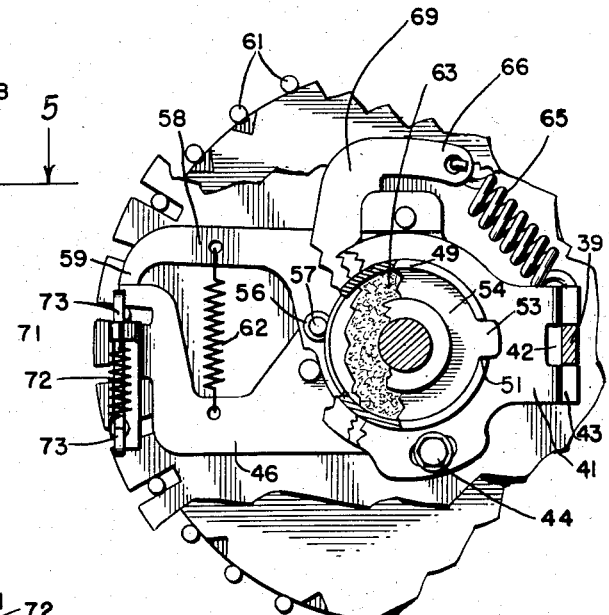
Fig. 5 is a plan sectional view taken approximately on line 5—5 of Fig. 4 showing in somewhat enlarged detail the stop arm latching mechanism.

The type wheel 35 is carried by a hollow shaft or sleeve 38. A downwardly extending tongue 39, which is integrally associated with the type wheel, transmits driving rotation from an arm or driving plate 41, bifurcated as best indicated in Fig. 5, at 42 and thereat receives the driving tongue 39, so as to permit the independent vertical movement thereof in accordance with a shifting of the type wheel during case shift control.

The apparatus which may be employed for shifting the type wheel is not illustrated but it is to be understood that any suitable manner of accomplishing this purpose is satisfactory. Of primary importance towards an understanding of the present invention is that portion of the apparatus which functions to regulate the radial or angular placement of the type wheel 35 and this is performed through a clutch and the coupling between the bifurcated tongue 41 and the downwardly extending tongue 39. The instant disposition of the type wheel 35 is accordingly dependent upon the corresponding arrestment of plate 41. This member is adjustably secured to a rigid yoke 43 by means of the anchor bolts 44, which pass through elongated slots in plate 41 and are threaded into the uppermost section 45 of yoke 43.

The channel shaped member which has been described generally as yoke 43 is preferably formed of sheet metal and in addition to its plate section 45, it is also provided with a lower level section 46, having an opening therein of size to snugly receive the reduced diameter 47 of the driving shaft. The upper portion of the yoke has a corresponding opening in concentric alignment but of considerably larger diameter so as to pass the proportionately larger diameter of the drum portion 48. The drum portion 48 of the drive shaft also extends through a similar opening in plate 41, and thereat it is encircled by a short sleeve 49, Figs. 4 and 5, which closely defines the drum 48 and which is notched as at 51 and 52 to receive the opposite tongues 53 of a friction clutch disc 54.

Figure 4:
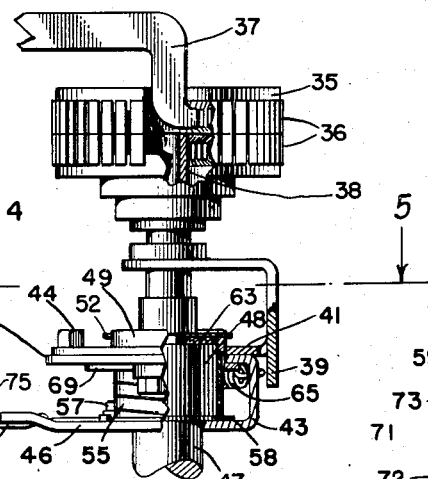
Fig. 4 is a side elevation of the apparatus illustrated in Fig. 3 with portions thereof broken away and in section.

A constrictor spring 55, generally resembling the one discussed in the preferred embodiment above is disposed so that one of its ends, Fig. 4, is received within a rectangular notch of the sleeve 49 which is preferably an integral member with the sidewardly extending arm 66 to be described later, and is confined thereat against displacement by the close-fitting relationship between drum 48 and the sleeve 49. The other end 56 of the constrictor spring 55 is turned upon itself to form an eyelet which fits over an anchor pin 57, Fig. 5, carried in another sheet metal lever 58. Accordingly, while the uppermost end of spring 55 is held with respect to sleeve 49, relatively inert, the lowermost end 56 is movable together with its anchor pin 57 which is an integral part of a lever 58 that is pivotally supported upon the drum section 48.

Lever 58, as best seen in Fig. 5, is provided with a hooked extremity 59, which is disposed at a distance from the axis of rotation of shaft 47 so as to engage any one of the selectable pins 61 when the latter may be disposed in selected (inwardly extending) position and to just clear the remaining pins in so doing. Moreover, the direction of winding of spring 55 is such that the clockwise, Fig. 5, movement of lever 58 tends to open or distend its convolutions thereby increasing its internal diameter and permitting relative slippage of drum 48 within the coils of said spring 55.

As thus far described, the cooperation of coil spring 55 and its drum 48 as a coupling is fundamentally not unlike that discussed above in the preferred embodiment. Additional apparatus will now be described for obtaining a more practical performance of this type of clutch apparatus in connection with type wheel printer selection. When the convolutions of spring 55 are released, that is to say, when lever 58 is no longer held in its clockwise position, as will later be explained, an auxiliary spring 62 aids in restoring said lever 58 to its counterclockwise position whereupon the coils of spring 55 tighten about the drum 48. Tests have proved that this abrupt introduction of power to the driven elements of the clutch which are at rest and which comprise an appreciable mass, may cause some degree of slippage and therefore may result in the firm engagement between the driving and driven bushings of the clutch only after an interval of relative angular displacement has been permitted to take place and in order to offset this effect, an auxiliary friction type of driving apparatus is provided.

At 63 on the upper surface of driven drum 48, there is a disc of fibrous material. Also just above this material there may be noted a metal disc 54 having the aforedescribed opposite tongues 53 which are received within notches in the peripheral lip of the sleeve 49 which is disposed above spring 55 and encircling drum 48. The sleeve 49 is associated with the driven portion or spring 55 of the clutch assembly and the arrestment thereof will also hold the disc 54 against rotation under a comparatively mild driving torque imparted by the friction material 63. This force together with the initial starting torque of spring 55 has been found to overcome to a satisfactory degree, the normal tendency to slippage between drum 48 and said spring 55, though the idle load of friction clutch 63—54 of itself is insufficient to constitute a material strain upon the driving motor as do conventional friction clutches, discussed above.

It is to be recognized also that when a selected pin 61 is restored to its peripheral non-selected position and thereby constrictor spring 55 is permitted to resume its driving engagement with drum 48, a considerable mass is suddenly moved including the driven portion of the clutch mechanism and the type wheel 35. In order to absorb a portion of this starting load, an additional yield is provided in the form of a shock absorbing spring 65, one end of which is looped through the rearmost and upright portion of yoke 43 as best seen in Fig. 6, and the other end of which is connected to a sidewardly extending arm 66, Fig. 5, integrally associated with sleeve 49 and having abutting shoulder engagement as at 67, Fig. 6, with a stop lug 68 that forms an integral part of the yoke 43.

Figure 6:
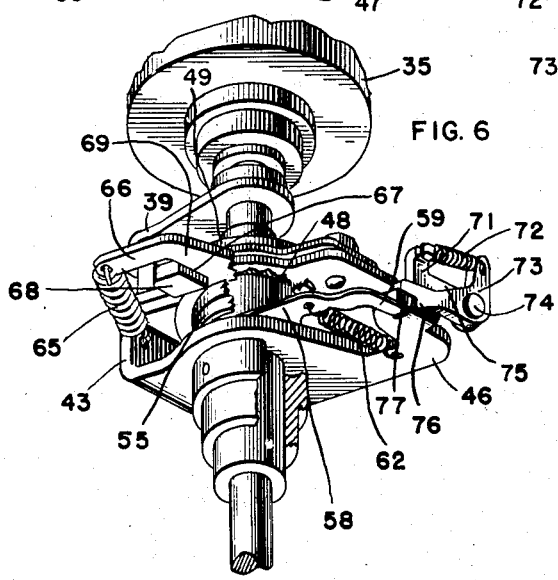
Fig. 6 is a detailed perspective view of some of the elements featured in the modified embodiment illustrated in Figs. 3 to 5.

When the driven constrictor spring 55 binds firmly about the drum 48 rotating said spring in a clockwise direction as viewed in Fig. 6 (counterclockwise in Fig. 5) sleeve 49, together with its integral arm 69, are first rotated in the same direction as drum 48 with the starting load being absorbed by the stretching of spring 65. Presently the driven portion of the clutch including particularly yoke 43, begins to follow the driving torque under the yieldable influence of spring 65 until the stop lug 68 overtakes the shoulder 67 of arm 69 whereupon driving connection will be effected at a comparatively precise point of association.

When the clutch spring expander arm 58 engages any one of the selected pins 61 after the latter has been moved inwardly into its selected position and thereupon when said arm 58 is rotated clockwise, Fig. 5, as a result of the impact with said pin opening the coils of constrictor spring 55, there is a tendency for said arm 58 to attempt to return to its normal position as influenced by the spring 55 as well as by its auxiliary spring 62. To permit of this would, of course, cause the convolutions of constrictor spring 55 to embrace again the drum 48 until sufficient motion was imparted therethrough to cause said arm 58 to again be driven outwardly by the impact with the selected pin 61. Thus, a chatter condition might obtain, that is, one in which the clutch elements 48 and 55 will alternately engage and disengage as arm 57 is oscillated to and fro upon repeated impact with a selected pin 61. In order to avoid this possible condition, the lowermost plate 46 of yoke member 43 is provided at its extremity with an upturned lug 71 which forms an anchor for one end of a latch spring 72, whose other end is secured to one arm of a latch lever 73 pivoted at 74 to an integral side extension 75 of the aforementioned upstanding lug 71.

The horizontal arm of latch lever 73 is provided with a shoulder tooth 76 disposed so as to afford a space between itself and a horizontally extending lug 77 formed integral with the lowermost plate section 46 of yoke 43.

During operation, lever 73 being freely pivoted at 74 and under the influence of spring 72, permits an oncoming selected rod 61 to ride under its horizontal arm and be rotated clockwise as viewed in Fig. 6, before the extremity of said selected pin 61 encounters the sidewardly extending portion 59 of clutch control arm 58. Thereafter, when engagement between said pin and portion 59 occurs, the extremity of pin 61 passes beyond the shoulder 76 and is retained within the space afforded between said shoulder and the lug 77. Since the pin is thus held securely with respect to the driven yoke 43, there cannot be permitted thereafter any relative backup movement of said yoke 43 with the possibility of the resulting chatter as afore-described.

While the present invention has been explained and described with reference to specifically contemplated embodiments, it is to be understood, nevertheless, that numerous changes and modifications may be had without departing from the essential spirit or scope thereof. Accordingly, it is not intended to be limited by any of the language of the foregoing detailed description nor by the particulars of the accompanying illustrations except as indicated in the hereunto appended claims.

What is claimed is:

1. A driving coupling comprising a continuously rotatable shaft, a helical spring constricted about said shaft, a driven apparatus fastened to one end of said helical spring, and an obstruction element selectively associated with the other end of said spring, said spring being wound in a direction so as to become distended to relax its constriction upon said shaft when said element encounters its associated end of said spring.

2. A clutch coupling for printing telegraph apparatus, comprising a continuously rotatable shaft, a convolute spring member disposed about said shaft, and having a normal tension to constrict itself about the peripheral surface of said shaft, a driven object secured to one end of said convolute member, and arrestable means associated with the other end of said convolute member disposed to be obstructed by an external interference member for thereby distending said convolute member and relaxing its grip on said shaft.

3. In a printing telegraph apparatus, a continuously rotatable shaft, a plurality of selectable elements circumferentially disposed about said shaft, a type wheel idly carried by said shaft, a constrictor spring disposed about said shaft, having one end associated with said type wheel, and means carried by the other end of said spring for being encountered by said selectable elements, to distend the convolutions of said spring and thereby to relax its constriction upon said shaft.

4. In a printing telegraph apparatus, the combination of a continuously rotatable driven shaft, an intermittently arrestable type wheel, a plurality of selectors each movable for determining a position of arrestment of said type wheel, and a clutch coupling carried by said shaft and controlled by said selectors for arresting said type wheel in various angular positions comprising a convolute spring constricted about the periphery of said shaft having one end rotatable with said type wheel, and means carried by the other end of said convolute for encountering said selectors and distending said convolute spring to relax its constriction upon said shaft.

5. A mechanical clutch coupling comprising in combination, a rotatable shaft having a cylindrical surface, a convolute spring of flat stock material wrapped about said shaft so as to engage with its flat surface the cylindrical surface of said shaft, said convolute spring having a normal spring tension to adhere to said cylindrical surface, and having securing means at its leading end and at its trailing end, driven means associated with the trailing end of said spring, and obstruction means associated with the leading end of said spring.

6. In a printing telegraph apparatus, a continuously rotatable power shaft, a type wheel loosely carried by said shaft, having a driving tenon, a yoke carried by said shaft having a forked portion for receiving said tenon, a plurality of selectors disposed circumferentially about said shaft, a free arm carried by said shaft, and a constrictor spring carried upon said shaft within said yoke having a normal spring tension so as to constrict itself about said shaft, said spring having one end secured to said yoke and the opposite end secured to said free arm whereby when said free arm encounters a selected one of said selectors said spring will be distended and thereby relax its constriction upon said shaft.

7. A mechanical clutch coupling comprising in combination a rotatable shaft having a cylindrically surfaced drum, a convolute spring of flat stock material coiled about said drum so as to constrict itself under tension thereabout, means responsive to any one of a plurality of selectable elements during the rotation of said shaft for distending the convolutions of said spring for thereby disengaging said spring from said drum, and means for latching said distending means in distended condition subject to the withdrawal of said selectable elements.

8. In a printing telegraph apparatus, the combination of a continuously rotatable driven shaft, an intermittently arrestable type wheel, a plurality of selector pins disposed parallel to and surrounding said shaft in a circular alignment, means for individually selecting said pins by displacement from said circular alignment, and a clutch coupling having a driving element carried by said shaft and a driven element associated with said type wheel comprised of a constrictor spring and a cylindrical member within said constrictor spring, and means for holding said constrictor spring distended so as to permit said cylindrical element to rotate freely, said means being responsive to any one of said selector pins when selected.

EDWARD S. LARSON.